No. 779,379. PATENTED JAN. 3, 1905.
T. SLOPER.
PROCESS OF MANUFACTURING RUBBERED CORD FOR USE IN RUBBER ARTICLES.
APPLICATION FILED SEPT. 21, 1904.
2 SHEETS—SHEET 1.
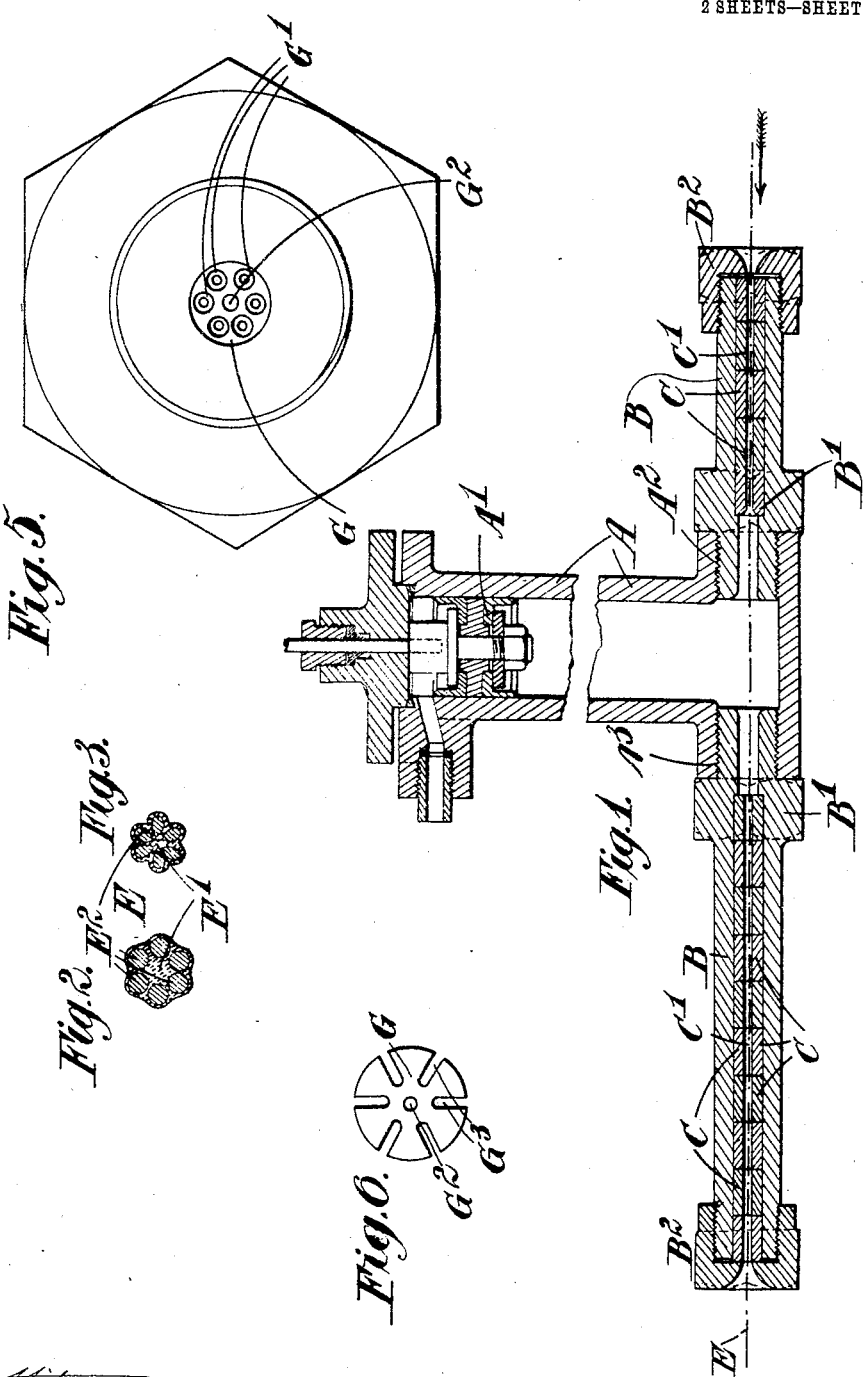

No. 779,379. PATENTED JAN. 3, 1905.
T. SLOPER.
PROCESS OF MANUFACTURING RUBBERED CORD FOR USE IN RUBBER ARTICLES.
APPLICATION FILED SEPT. 21, 1904.
2 SHEETS—SHEET 2.
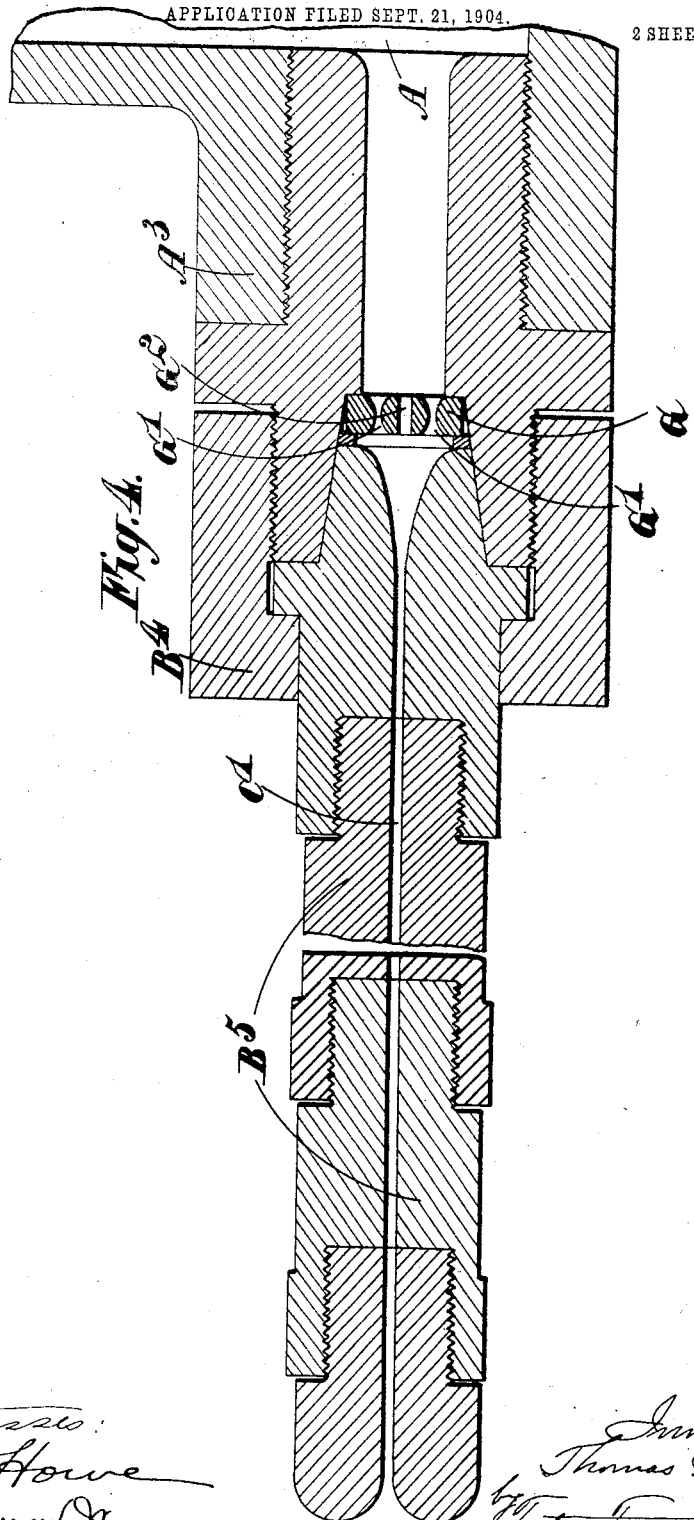

No. 779,379.

Patented January 3, 1905.

UNITED STATES PATENT OFFICE.

THOMAS SLOPER, OF DEVIZES, ENGLAND.

PROCESS OF MANUFACTURING RUBBERED CORD FOR USE IN RUBBER ARTICLES.

SPECIFICATION forming part of Letters Patent No 779,379, dated January 3, 1905.

Original application filed August 14, 1903, Serial No. 169,495. Divided and this application filed September 21, 1904. Serial No. 225,360.

*To all whom it may concern:*

Be it known that I, THOMAS SLOPER, a subject of the King of England, residing at Devizes, Wiltshire, England, have invented a certain new and useful Improved Process of Manufacturing Rubbered Cords for Use in Rubber Fabrics, of which the following is a specification.

This invention is for an improved process for manufacturing rubbered cords for use in rubber fabrics particularly adapted for use in the construction of pneumatic tires, hose-pipes, and the like which are subjected to pressure and distortion.

One of the objects to be attained according to this invention is to construct a stranded cord, each strand of which shall be impregnated and coated with rubber, so that a rubber film always separates and embeds the various strands, which prevents the sawing of one cord upon the other and, together with the impregnation, secures in the complete cord great flexibility. In carrying out this process each individual strand may be separately passed through rubber solution under pressure, after which the strands are brought together in straight form—that is, lying side by side with practically no twist. In this position the strands are dried—*i. e.*, the solvent is evaporated from the rubber solution—and then twisted together by convenient means to form the complete cord. The strands may be either brought together into straight form while the rubber solution is wet and then dried in this position, as described, or they may be dried separately and afterward brought together for twisting; but the order first described is preferred. By passing the strands through rubber solution under pressure each strand is not only coated with rubber but is impregnated with the same and the air driven out, which is an important point, as when air is inclosed in a rubber-coated strand great difficulty is often experienced during vulcanization, and also the strength of the strand is not equal to that of one in which the space otherwise occupied by the air is occupied by rubber. Generally it is preferred to introduce the various strands to form the thread simultaneously into the rubber solution and draw them together in straight form as they leave it. In this case the strands are separated while in the solution, so that each is surrounded with rubber solution and becomes thoroughly impregnated and coated, so that as the strands are brought together each is practically floating in rubber solution. As the strands are dried the rubber contracts, so that they are brought closer to each other, but still with rubber between them, and when dried they are twisted together, as described. It is found that if the strands are twisted together before drying the rubber is squeezed out from between them and such a good result is not obtained. In some cases it is preferred when bringing the strands together in straight form to insert at the center a rubber core. This may be done by feeding in a solid-rubber core between them and retaining it in the center when twisting; but as it is found difficult to keep the core in the center during twisting it is preferred to feed it in in the form of rubber solution. For this purpose the strands when separated in the rubber solution are arranged in the form of a circle and withdrawn therefrom in the same form, so that a body of rubber solution will be inclosed at the center, which when dried constitutes a central core. When treated in this manner, the rubber is not found to be dislodged from the center while twisting the strands together; but it will be understood that while a central rubber core is referred to this may only mean that all the interstices between the separate strands are filled with rubber, as owing to shrinkage during drying the strands may approximate very close to each other. It will be understood that this process may be repeated as many times as may be necessary to produce a cord of the desired size—that is, a number of cords made up of strands in the manner described may be twisted together to form a single multiple cord, the various cords themselves forming this multiple cord being each treated, if desired, in the same manner as their separate strands.

In the accompanying drawings, which for convenience illustrate apparatus for carrying out the process described, Figure 1 is a central longitudinal section of a convenient apparatus for treating a strand with rubber solution. Figs. 2 and 3 are enlarged views of a section through a completed cord, showing the position of the strands. Fig. 4 is a central longitudinal section illustrating a method of adapting the single-strand apparatus shown in Fig. 1 for the treatment of a plurality of strands. Fig. 5 is an end view of Fig. 4, and Fig. 6 is a detail.

Like letters indicate like parts throughout the drawings.

Referring first more particularly to Fig. 1, A is a portion of a cylinder containing the rubber under pressure, which may be applied in any convenient manner, preferably by a piston A', worked hydraulically, but needing no detailed description, since it forms no part of the invention. The end of the cylinder A is provided with two bosses $A^2$ $A^3$, placed opposite each other and each bored and provided with a screw-thread. Into the boss $A^2$ is screwed a tube B, in the bore of which are a number of perforated blocks C, accurately fitting the bore and placed end to end, so that the hole pierced centrally through each of them forms a continuous passage C'. The blocks are held firmly but removably within the tube B—say by one end block abutting against a shoulder B' in the tube B toward the end which is screwed into the cylinder—while a perforated cap $B^2$ is screwed over the free end of the tube. The boss $A^3$ is provided with a similar tube B, preferably of greater length, as shown in the figures. The passages C' are formed of a diameter approximately the same as that of the strand to be treated. The latter is placed in the position shown by the broken line and drawn through in the direction of the arrow by any convenient known device while pressure is applied to the rubber. It is found in practice that the entry-passage may be shorter than the exit, the strand when moving against the normal direction of flow of the rubber preventing its being driven by the pressure so far along the passage as when the two are moving together. The forming of the passages C' of a number of blocks not only facilitates the initial placing of the cord in position, but allows the same apparatus to be used for single strands of varying diameter by merely changing the blocks C.

In Fig. 4 is illustrated a modified form of the tube B, hereinbefore described, adapting the apparatus illustrated in Fig. 1 to be used for the coating simultaneously of a number of strands. The modification consists, essentially, in placing within the end of the tube, adjacent to the rubber cylinder A, a perforated disk or guide G to hold the strands apart while passing through the rubber cylinder A. The number of perforations is of course arbitrary, depending on the number of strands used to form the cord. As shown in Fig. 4, the guide G is provided with six perforations G' to receive the strands and a central perforation $G^2$ for the free passage of the rubber to form the core. The tube B is shown formed in sections $B^5$ by screwing one into the other, the central passage C' being formed in these sections and the inner blocks C dispensed with. The guide G is held between the two first sections of the tube B, and these may be connected by a screwed cap $B^4$, as shown in the figure.

Instead of perforations G' the guide may be provided with slots $G^3$, as shown in Fig. 6. The guide may be placed in any suitable position in or adjacent to the pressure-chamber and more than one guide may be employed, if desired.

The strands and rubber issuing from the passage form a cord E, such as is shown in section in Fig. 2, having a central core of rubber surrounded by the strands coated and impregnated with rubber. On drying the cord assumes more the shape shown in Fig. 3, the contracting rubber tending to change the circular threads into a pear shape.

Obviously a guide may be used in conjunction with the construction of apparatus shown in Fig. 1, so that this form of apparatus may also be used for treating several strands simultaneously and forming them into a single cord or cable.

To dry the solution preparatory to twisting the strands, the latter may be passed through a heated chamber conveniently situated between the solutioning apparatus and the device for drawing the strands through the latter. By this means the strands are dried before they arrive at the mechanism for drawing them through, so that they do not become appreciably flattened by contact with this mechanism, which would otherwise occur.

The cord produced by the process hereinbefore described forms the subject-matter of my application, Serial No. 169,495, filed August 14, 1903, of which case the present application is a division, and therefore no claim for such article is presented here.

What I claim as my invention, and desire to secure by Letters Patent, is—

1. The process for manufacturing rubbered cords for use in rubber fabrics consisting in passing the strands to form the cords through rubber solution under pressure so that the air is driven out and the strands impregnated and coated with rubber, drying them, and then twisting them together, substantially as set forth.

2. The process for manufacturing rubbered cords for use in rubber fabrics consisting in passing simultaneously through rubber solution under pressure the strands to form the cord so that the air is driven out and the strands impregnated and coated with rubber, bringing them together in straight form, drying them in this position, and then twisting them together, substantially as set forth.

3. The process for manufacturing rubbered cords, for use in rubber fabrics consisting in introducing simultaneously into rubber solution under pressure the various strands to form the cord, separating the strands when in the solution so that each becomes impregnated and coated with rubber the air being driven out, bringing them together in straight form, drying them in this position, and then twisting them together substantially as set forth.

4. The process for manufacturing rubbered cords for use in rubber fabrics consisting in introducing simultaneously into rubber solution under pressure the various strands to form the cord, separating the strands when in the solution so that each becomes impregnated and coated with rubber the air being driven out, bringing them together in straight form, having a central rubber core between the strands as they are brought together, drying them in this position with the rubber core at the center, and then twisting them together around the rubber core, substantially as set forth.

5. The process for manufacturing rubbered cords for use in rubber fabrics consisting in introducing simultaneously into rubber solution under pressure the various strands to form the cord, separating the strands in the solution and arranging them therein in the form of a circle so that each strand is impregnated and coated with rubber and the air driven out while the rubber lying within the circle of strands forms a central core, bringing them together in straight form but still arranged around the central core formed by the rubber solution lying between them, drying them in this position, and then twisting them together, substantially as set forth.

6. The process for manufacturing rubbered cords for use in rubbered fabrics consisting in passing the strands to form the cord through rubber solution under pressure so that the air is driven out and the strands impregnated and coated with rubber, drying them, then twisting them together to form a cord and twisting this cord together with one or more cords similarly prepared, substantially as set forth.

In testimony whereof I have signed my name to this specification in the presence of two subscribing witnesses.

THOMAS SLOPER.

Witnesses:
  R. STABLES,
  B. G. BISHOP.